(12) United States Patent
Asakawa et al.

(10) Patent No.: US 7,698,627 B2
(45) Date of Patent: Apr. 13, 2010

(54) METHOD, PROGRAM, AND DEVICE FOR ANALYZING DOCUMENT STRUCTURE

(75) Inventors: Chieko Asakawa, Yokohama (JP); Tarsuya Ishihara, Yamato (JP); Takashi Itoh, Machida (JP); Hironobu Takagi, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 919 days.

(21) Appl. No.: 11/462,871

(22) Filed: Aug. 7, 2006

(65) Prior Publication Data

US 2007/0038937 A1 Feb. 15, 2007

(30) Foreign Application Priority Data

Sep. 2, 2005 (JP) ............................. 2005-255548

(51) Int. Cl.
*G06F 17/00* (2006.01)
(52) U.S. Cl. ..................... 715/211; 715/202; 715/209; 715/277; 715/766
(58) Field of Classification Search ................. 715/202, 715/209, 211, 277, 766
See application file for complete search history.

(56) References Cited

U.S. PATENT DOCUMENTS

| | | | | |
|---|---|---|---|---|
| 5,067,165 A | * | 11/1991 | Nishida | 382/195 |
| 5,710,875 A | * | 1/1998 | Harashima et al. | 345/419 |
| 6,081,618 A | * | 6/2000 | Naoi et al. | 382/180 |
| 6,088,708 A | * | 7/2000 | Burch et al. | 715/229 |
| 6,392,644 B1 | * | 5/2002 | Miyata et al. | 345/419 |
| 7,000,197 B1 | * | 2/2006 | Bou et al. | 715/812 |
| 2002/0052692 A1 | * | 5/2002 | Fahy | 702/19 |
| 2002/0154128 A1 | * | 10/2002 | Zachmann | 345/474 |

(Continued)

FOREIGN PATENT DOCUMENTS

JP 2003076678 3/2003

OTHER PUBLICATIONS

Yang, Y. and Zhang, H., "HTML Page Analysis Based on Visual Cues," In 6th International Conference on Document Analysis and Recognition (ICDAR 2001), Seattle, Washington, USA, 2001, 6 pages http://ieeexplore.ieee.org/stamp/stamp.jsp?arnumber=00953909.*

(Continued)

*Primary Examiner*—Adam M Queler
(74) *Attorney, Agent, or Firm*—Yee & Associates, P.C.; Libby Z. Toub

(57) ABSTRACT

A device, a control method, and a program to increase the accuracy of voice read-out and text mining by automatically structuring a presentation file. The arrangement and practice of the invention involves an overlap grouping part for extracting overlap information between objects in a presentation file and grouping the objects as a parent-child relationship; a graph dividing grouping part for grouping the objects as a sibling relationship by representing the objects as nodes of a graph and by recursively dividing the graph so that a predefined cost between the nodes is minimized; a distance information grouping part for further grouping the objects as a sibling relationship if distance information between the objects is below a threshold determined by a predefined computation from a distribution histogram of the distance information; and a link information extraction part for extracting arrow graphics that represents a link relationship and generating link information including the link relationship and a link label. The resulting structured data is output as metainformation.

18 Claims, 19 Drawing Sheets

U.S. PATENT DOCUMENTS

| | | | | |
|---|---|---|---|---|
| 2002/0184172 | A1* | 12/2002 | Shlain et al. | 706/20 |
| 2004/0114801 | A1* | 6/2004 | Boose et al. | 382/180 |
| 2005/0010555 | A1* | 1/2005 | Gallivan | 707/2 |
| 2005/0063592 | A1* | 3/2005 | Li et al. | 382/181 |
| 2006/0082597 | A1* | 4/2006 | McDaniel et al. | 345/648 |
| 2006/0190809 | A1* | 8/2006 | Hejna, Jr. | 715/500.1 |
| 2007/0083810 | A1* | 4/2007 | Scott et al. | 715/525 |

OTHER PUBLICATIONS

Virmajoki, O. and Franti, P.,Divide-and-conquer algorithm for creating neighborhood graph for clustering, Pattern Recognition, 2004. ICPR 2004. Proceedings of the 17th International Conference on vol. 1, Aug. 23-26, 2004, pp. 264-267 vol. 1 http://ieeexplore.ieee.org/stamp/stamp.jsp?arnumber=01334103.*

Boose, Molly L., David B. Shema, and Lawrence S. Baum, Automatic Generation of Layered Illustrated Parts Drawings for Advanced Technical Data Systems, Oct. 14, 2004 http://www.springerlink.com/content/k4ct1gdtdctarh8c/fulltext.pdf.* http://www.rdpslides.com/pptools/ppt2html/index.html, pp. 1-2.

http://cita.disability.uiuc.edu/software/office/, pp. 1-4.

M. Cheriet et al, A Recursive Thresholding Technique for Image Segmentation, IEEE Transactions on Image Processing, vol. 7, No. 6, Jun. 1998, pp. 918-921.

J. Shi et al, Normalized Cuts and Image Segmentation, IEEE Transactions on Pattern Analysis and Machine Intelligence, vol. 22, No. 8, Aug. 2000, pp. 888-905.

N. Otsu, A Threshold Selection Method from Gray-Level Histograms, IEEE Trans. On Sys., Man, and Cybernetics, SMC-9, 1, 1979, 62-66.

* cited by examiner

[Figure 1]
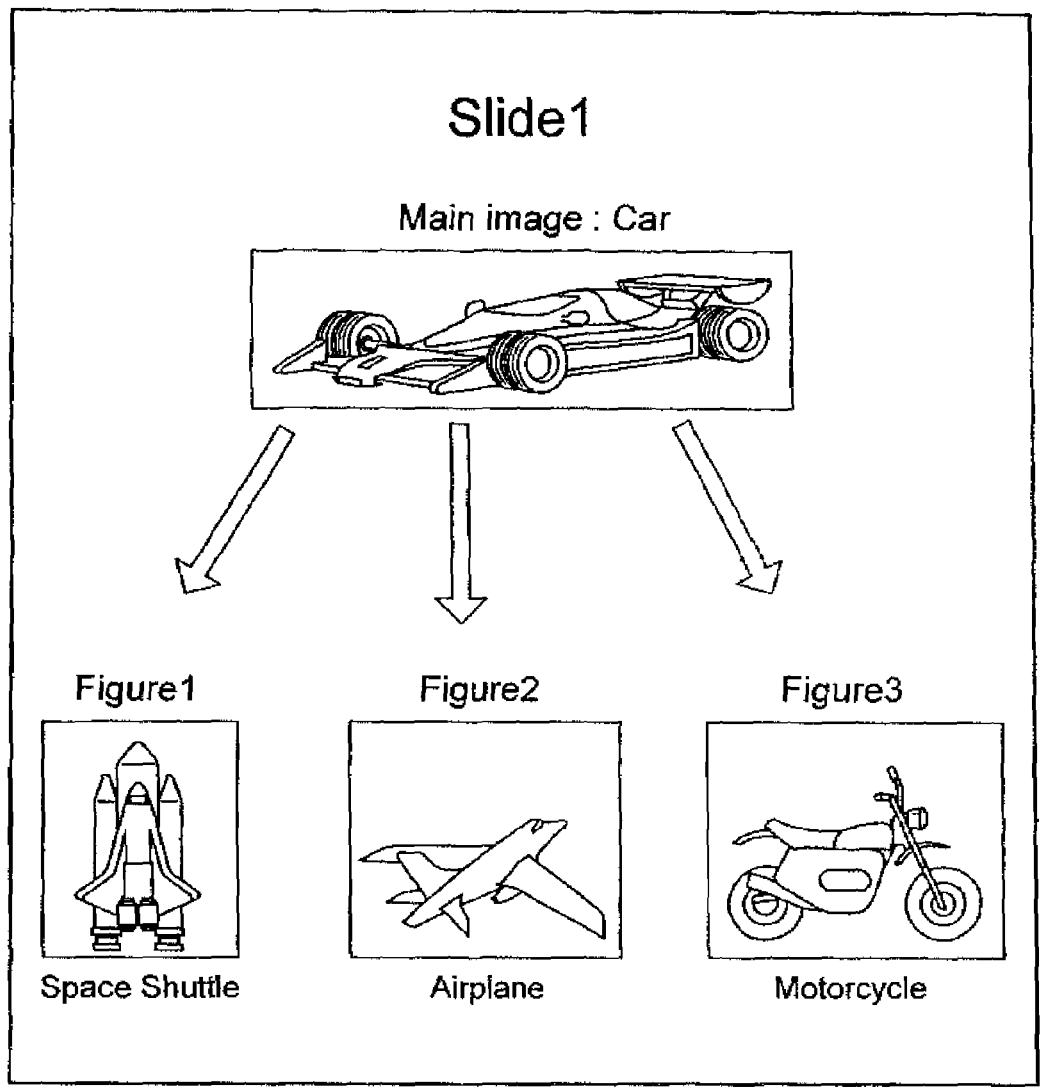

[Figure 2]
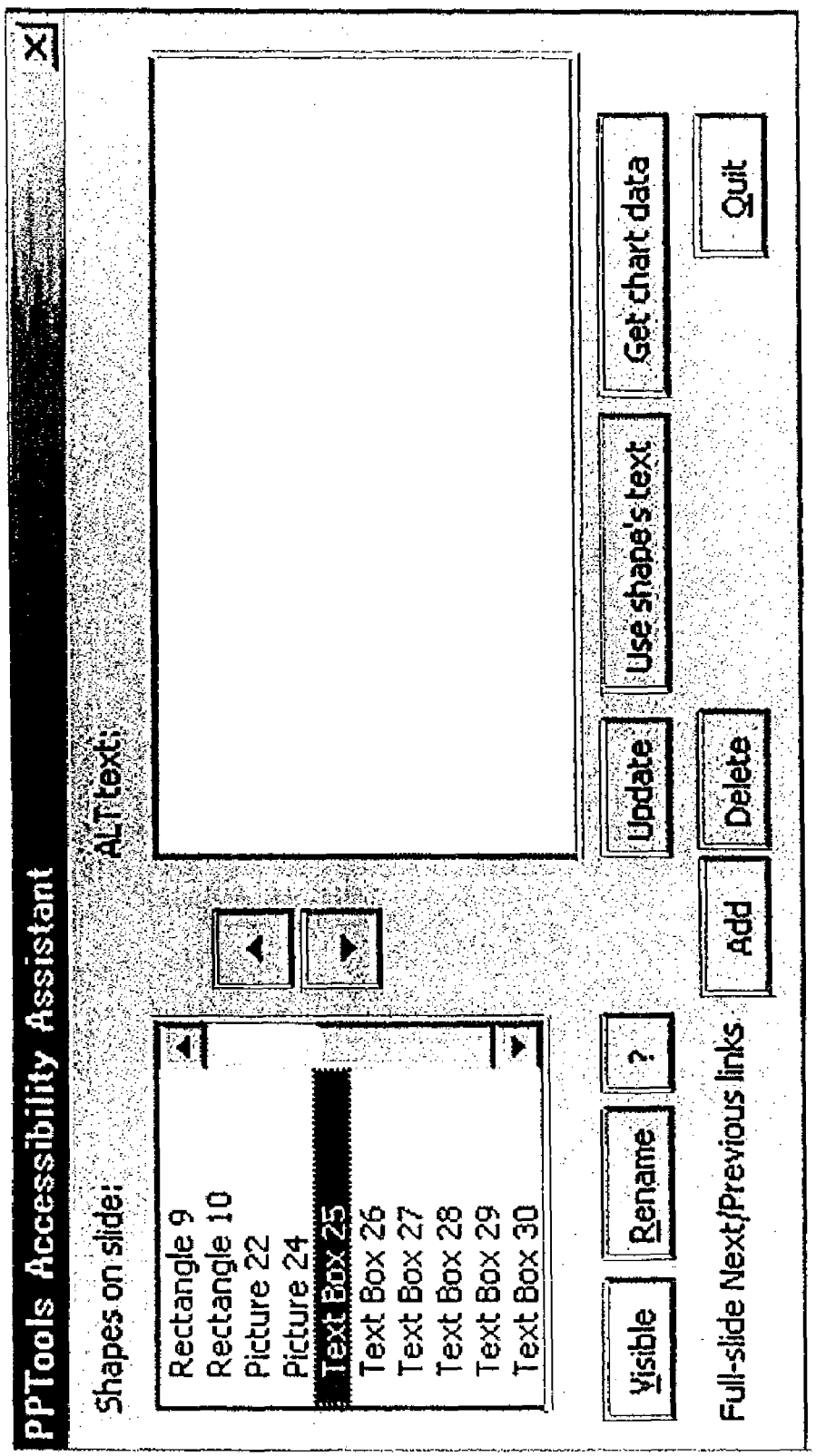

[Figure 3]
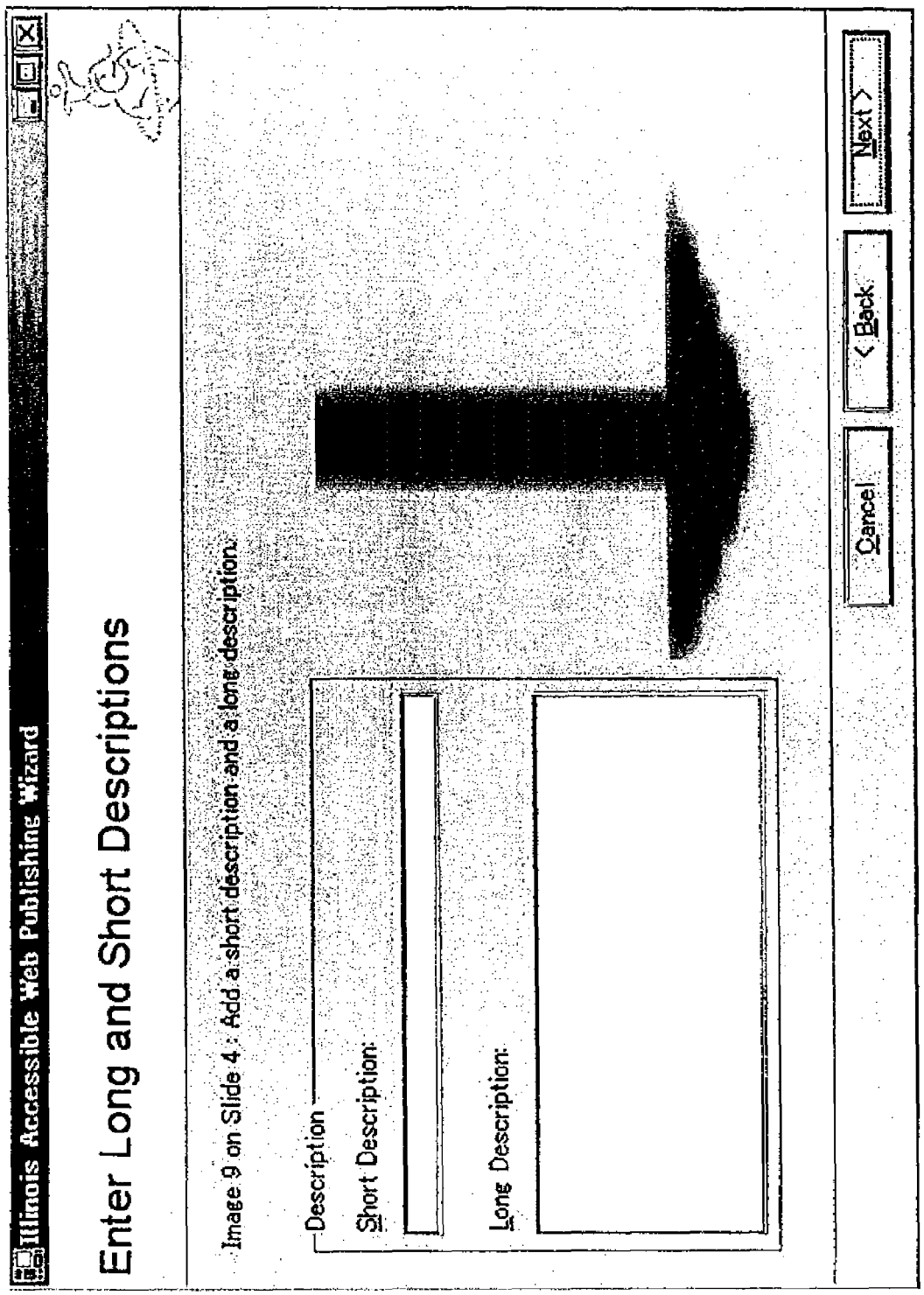

[Figure 4]
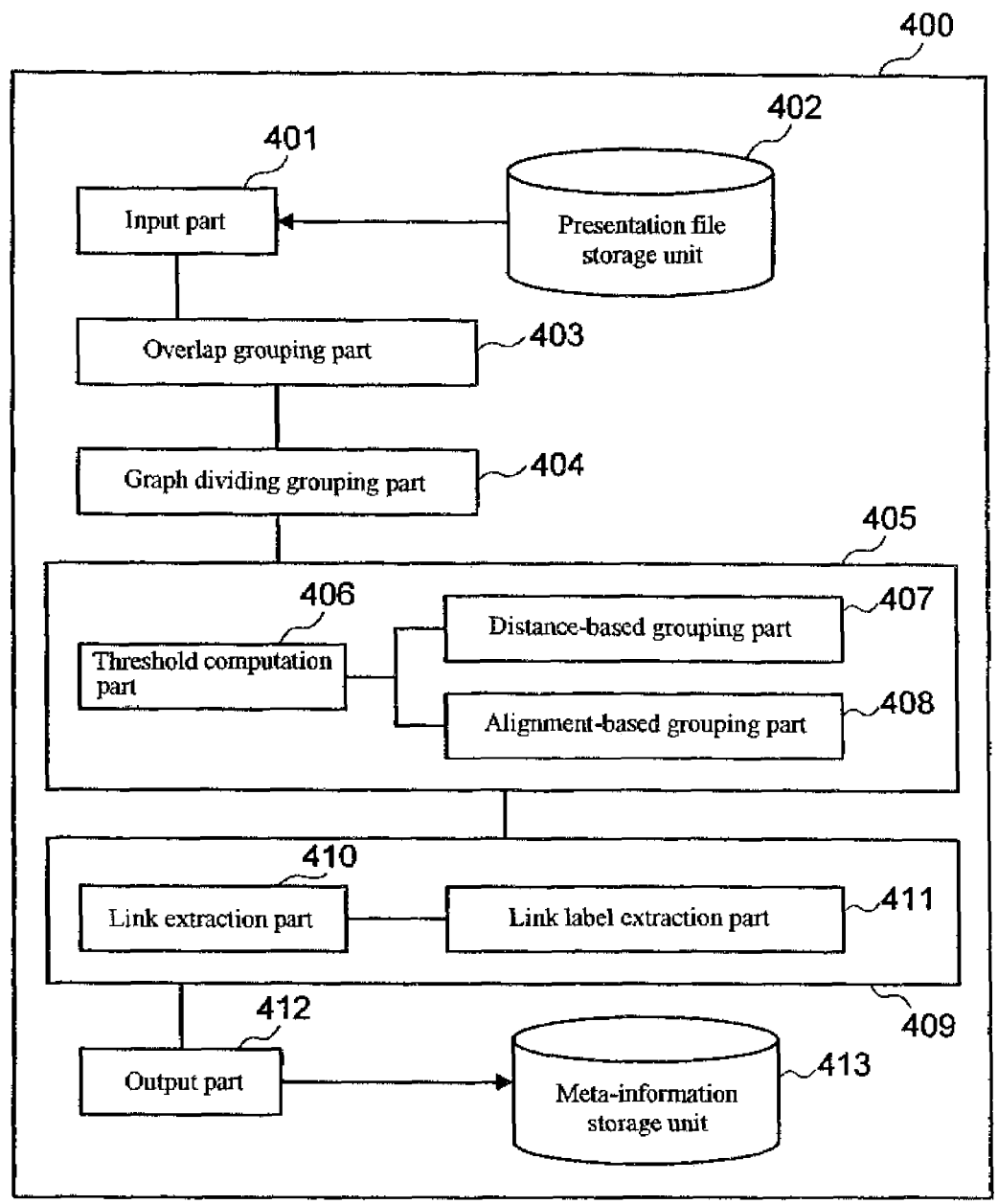

[Figure 5]
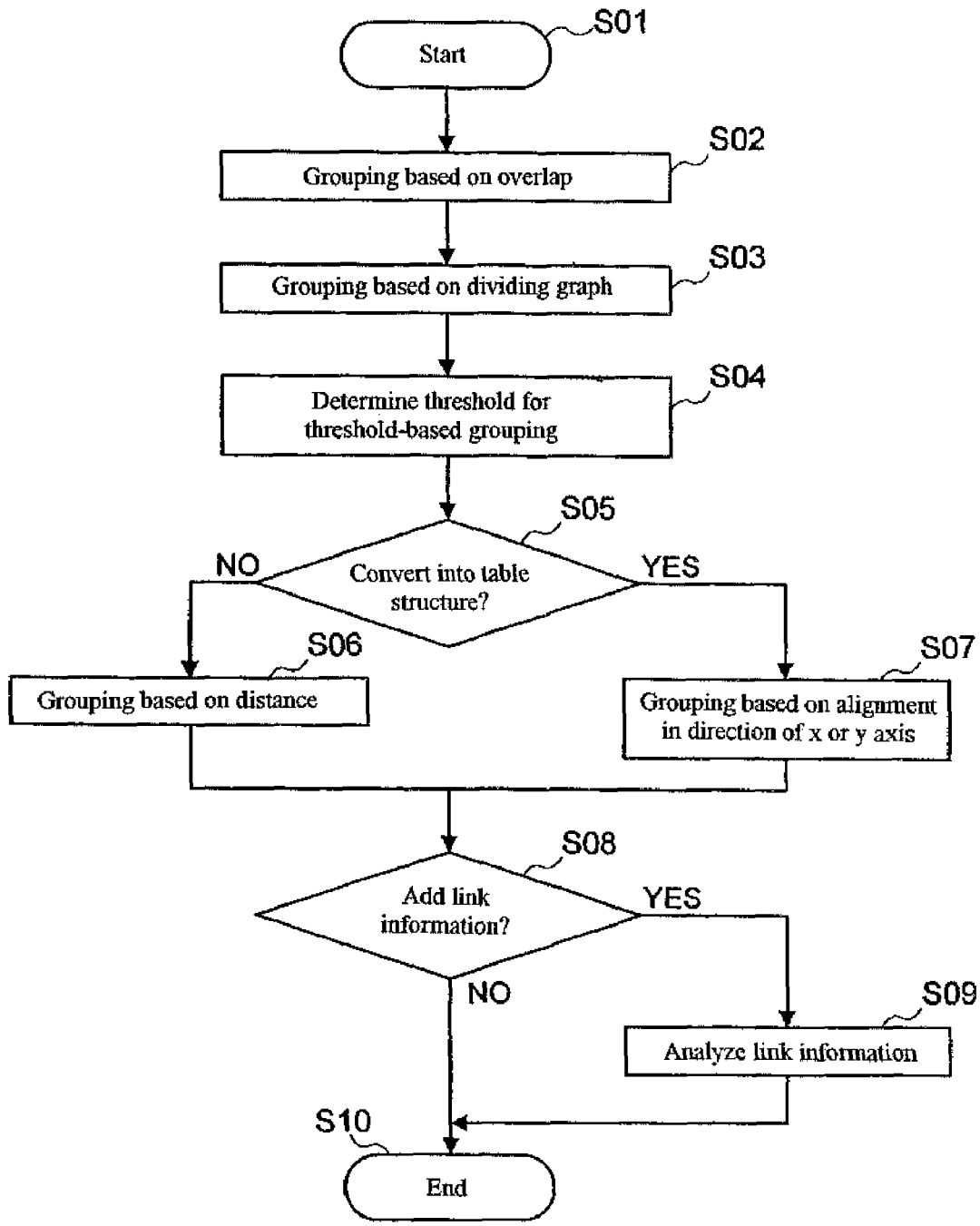

[Figure 6]
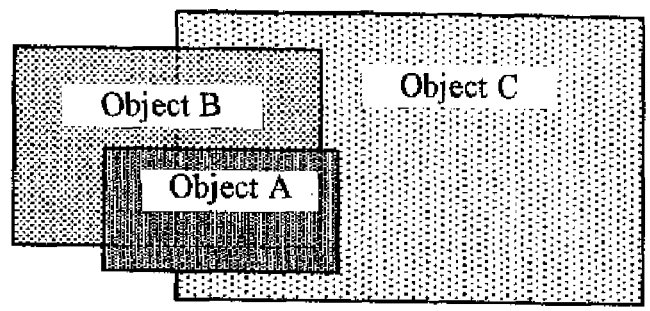
[Figure 7]
(a)
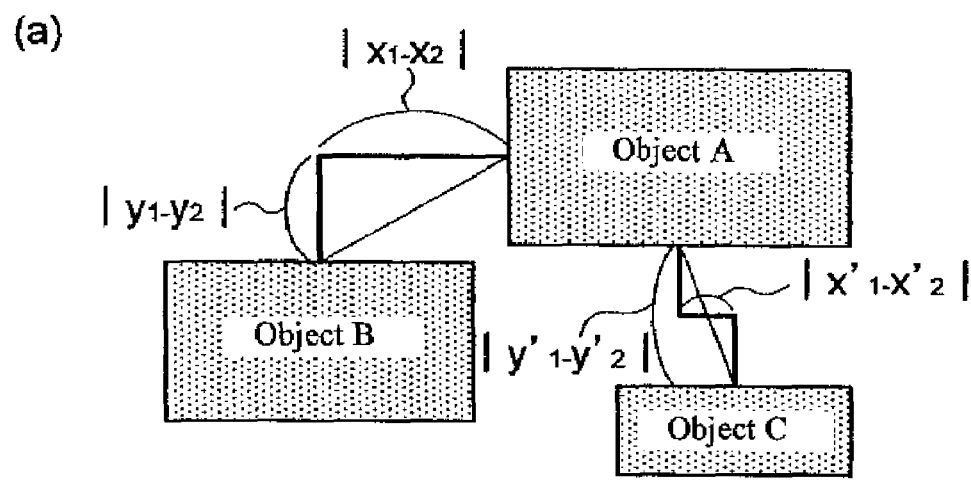
(b)
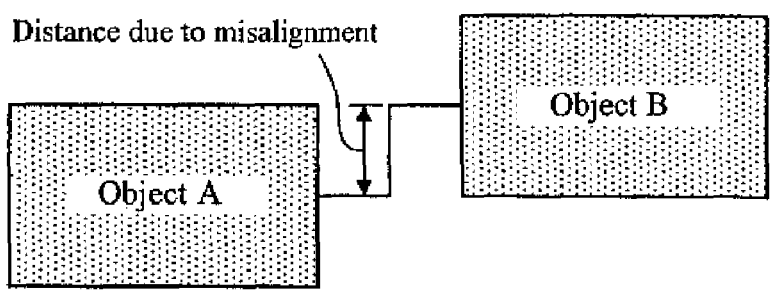

[Figure 8]
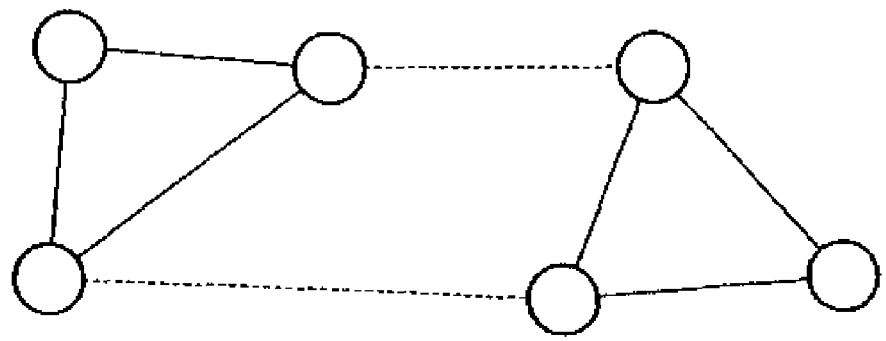

[Figure 9]
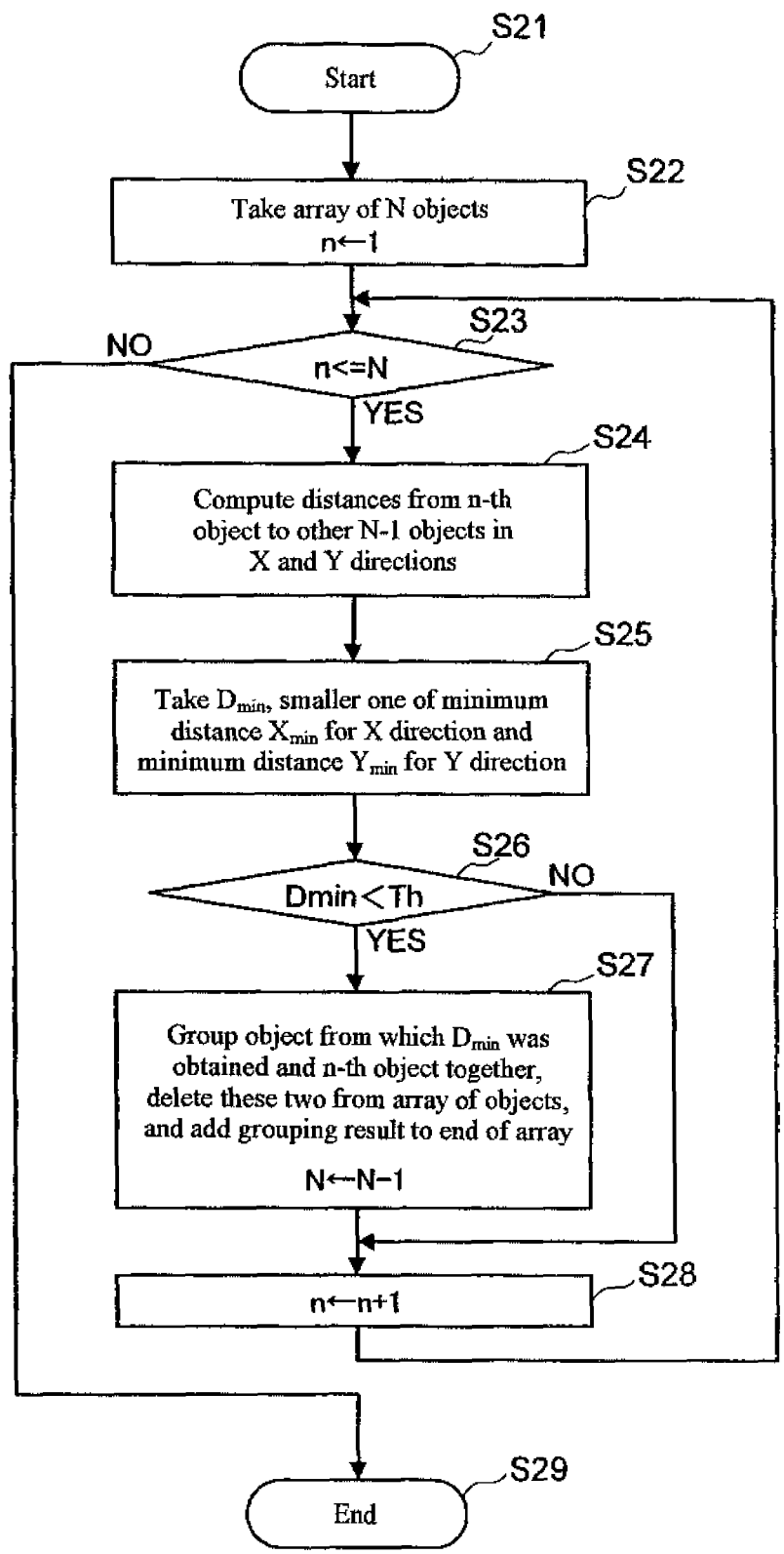

[Figure 10]
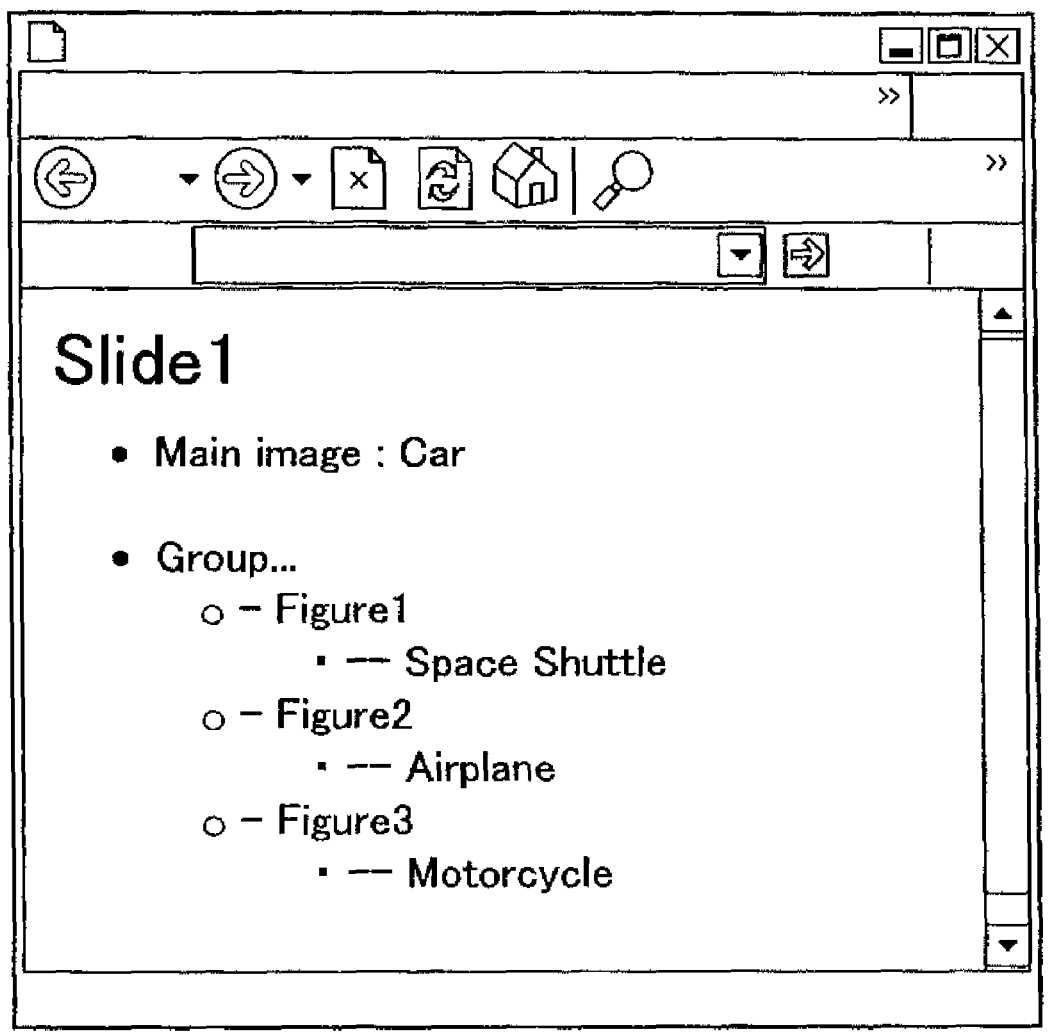

[Figure 11]
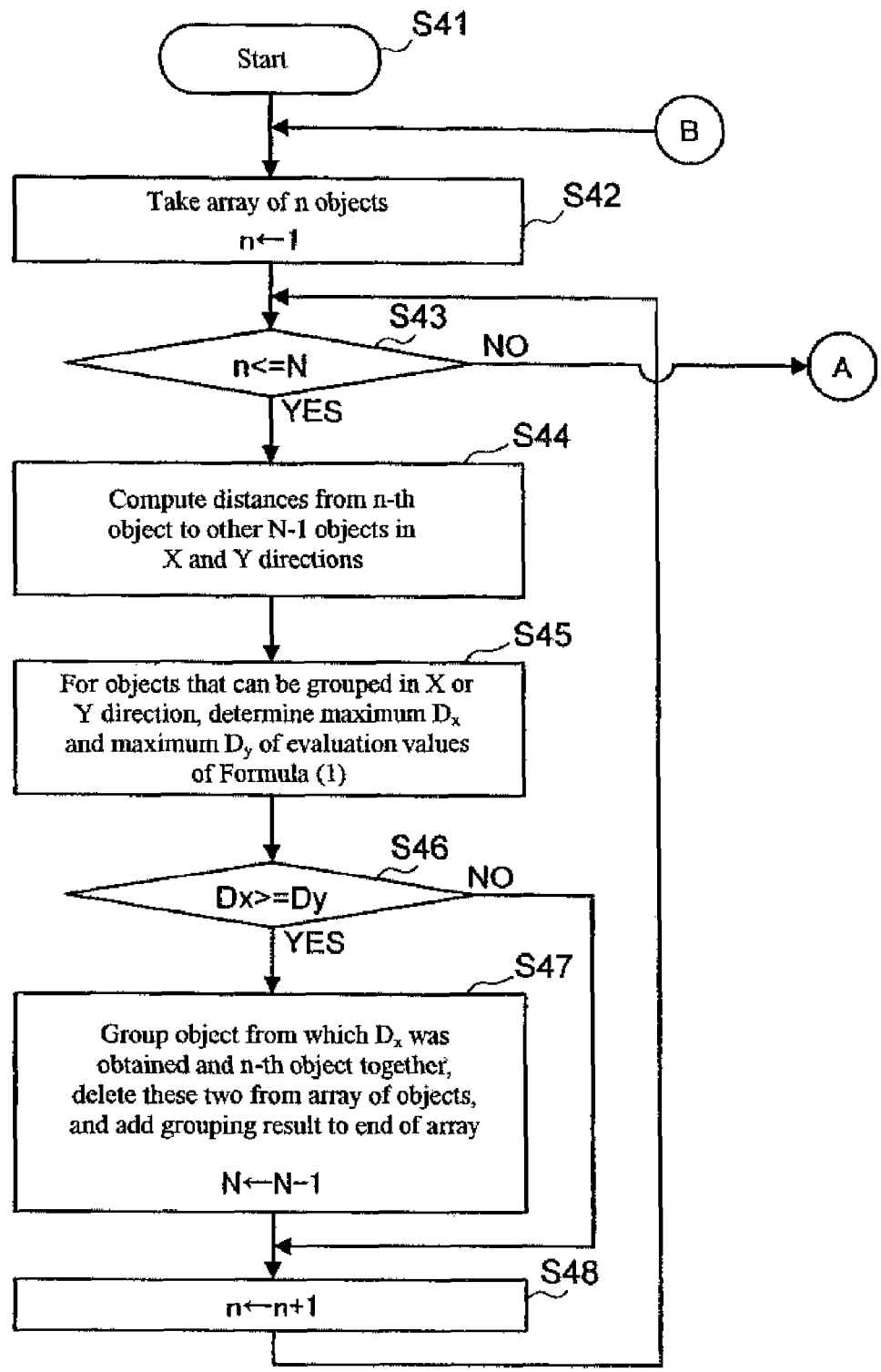

[Figure 12]
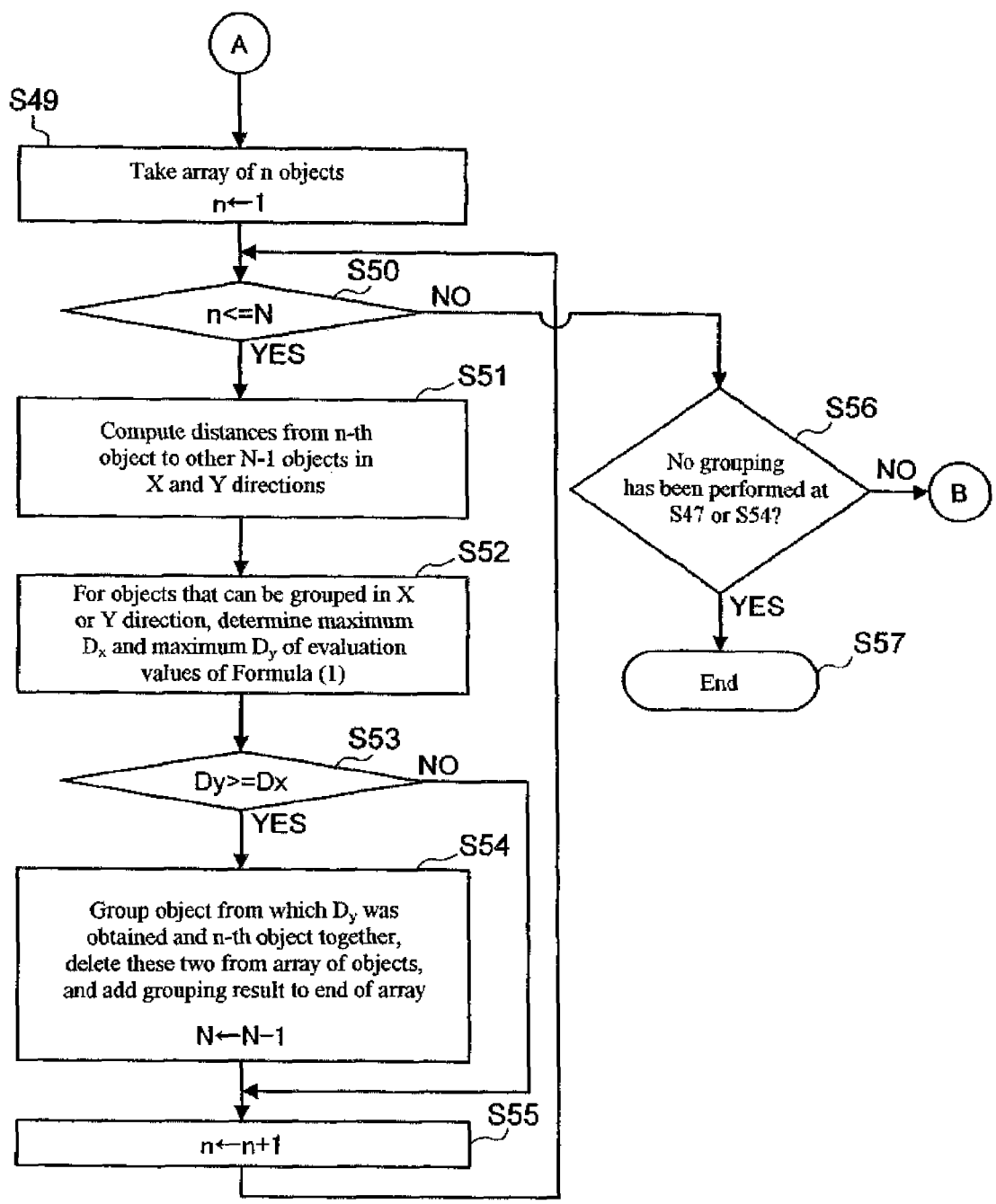

[Figure 13]
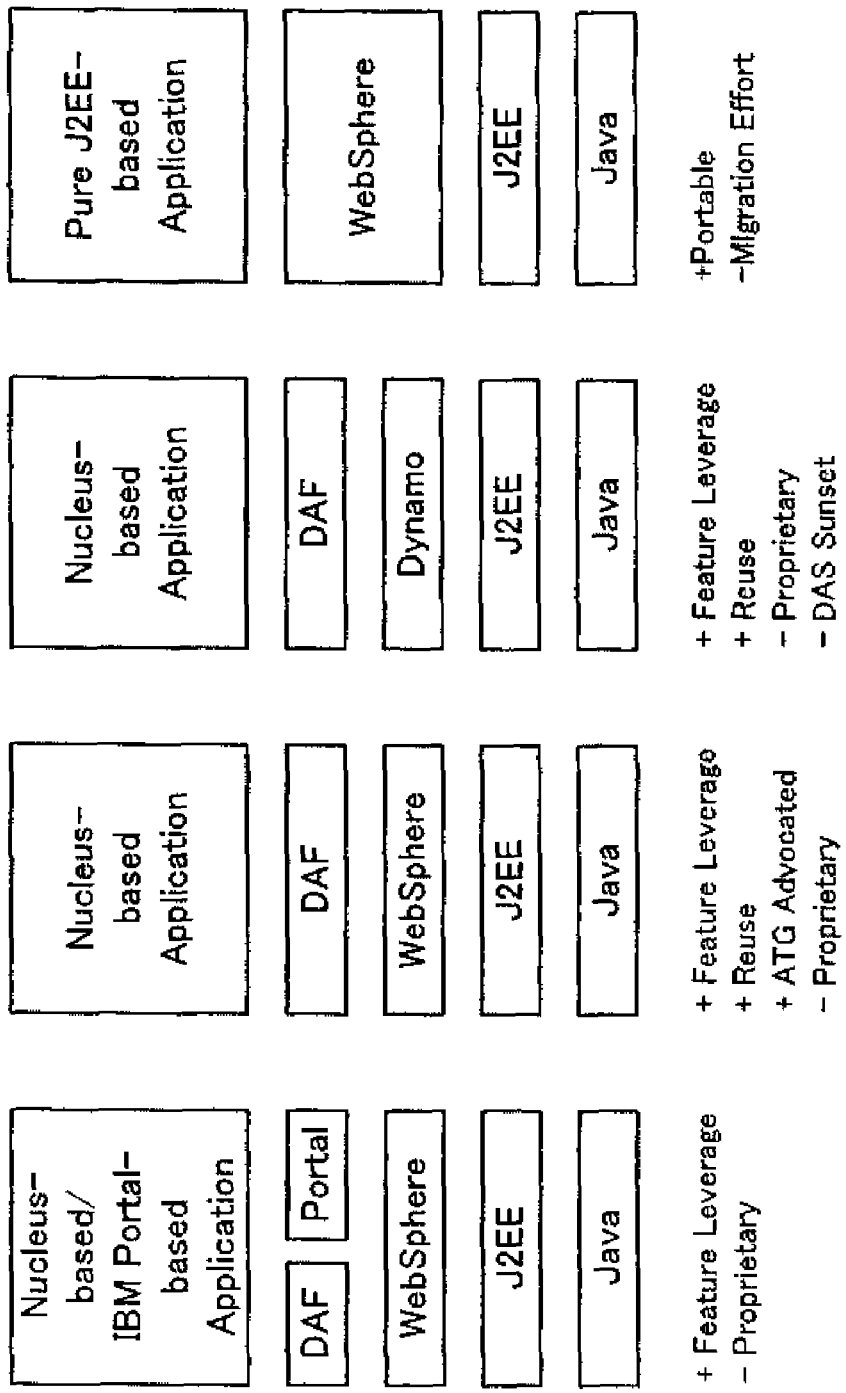

[Figure 14]
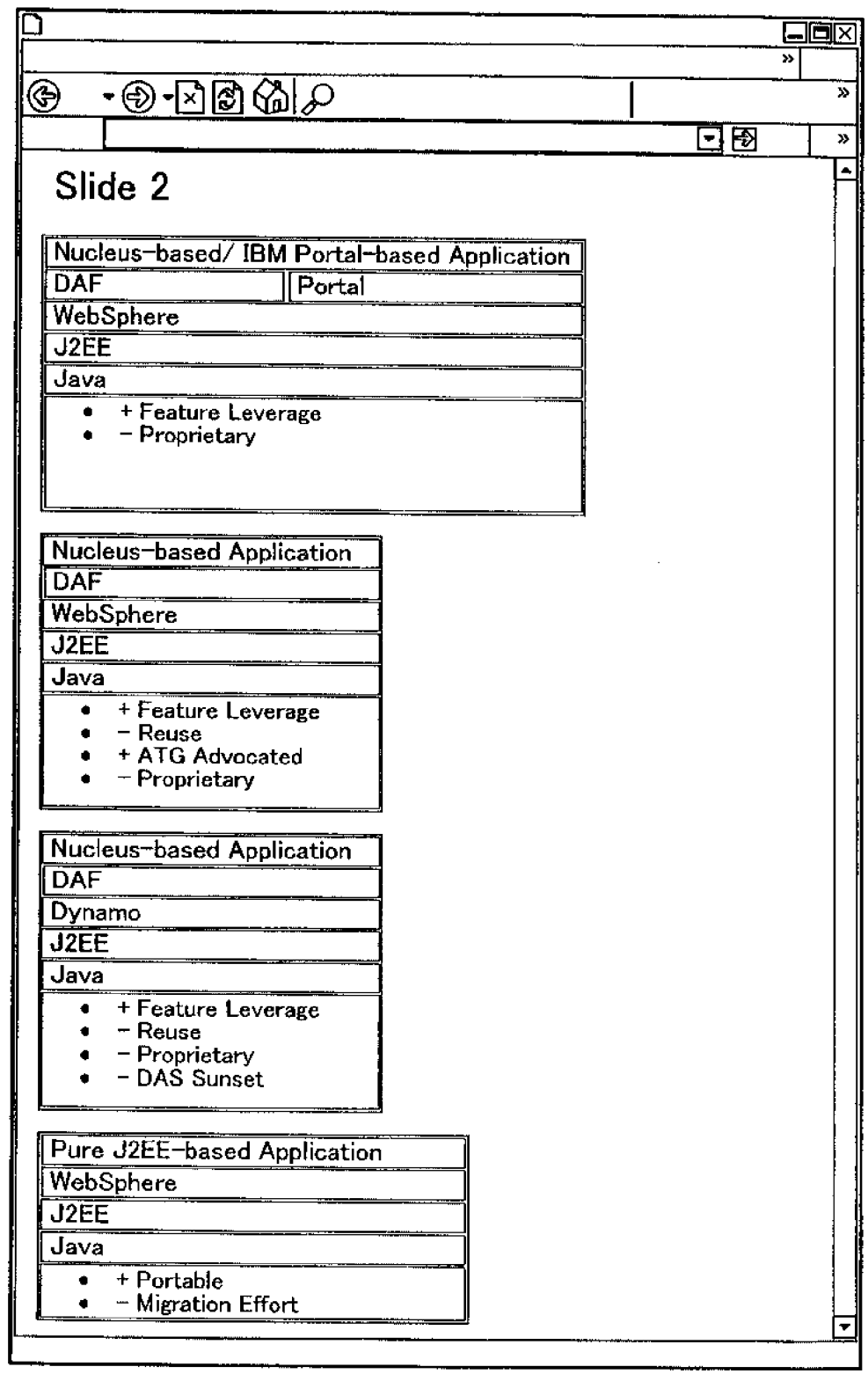

[Figure 15]
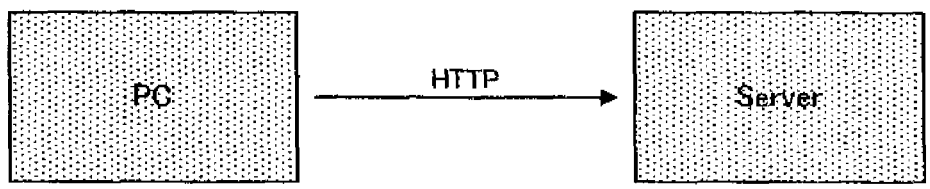
[Figure 16]
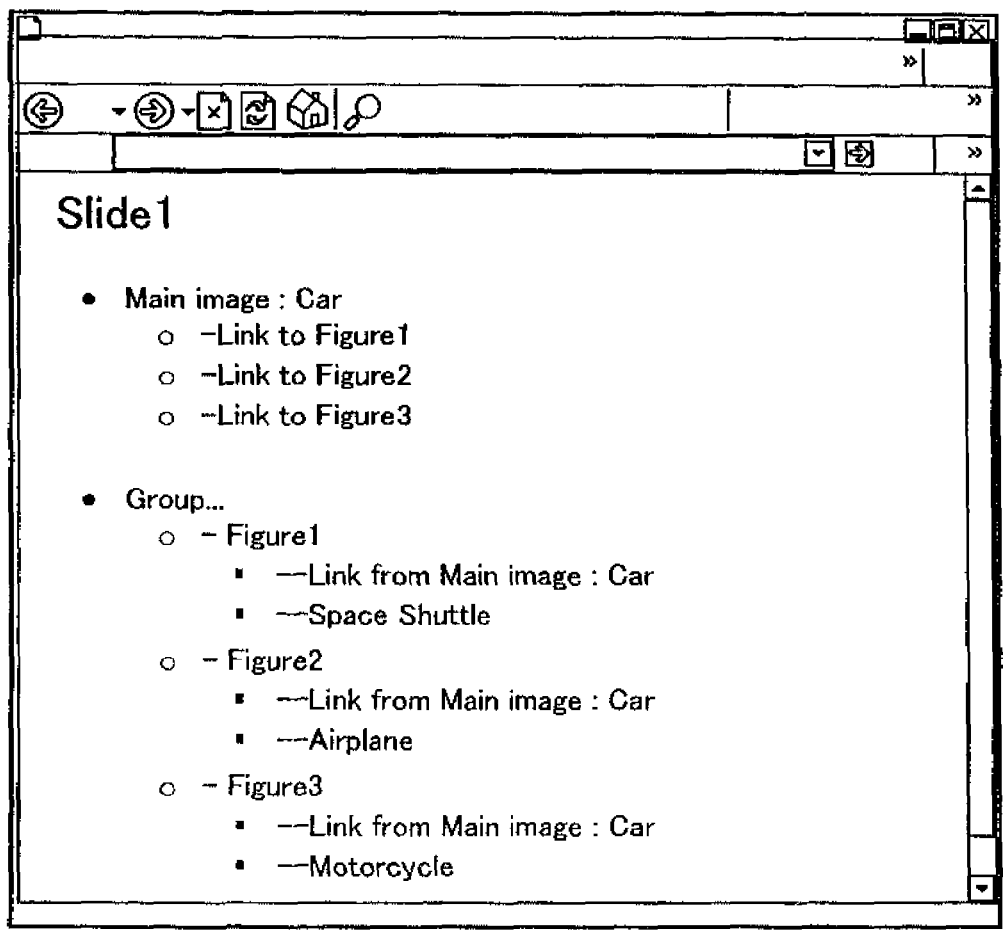

[Figure 17]
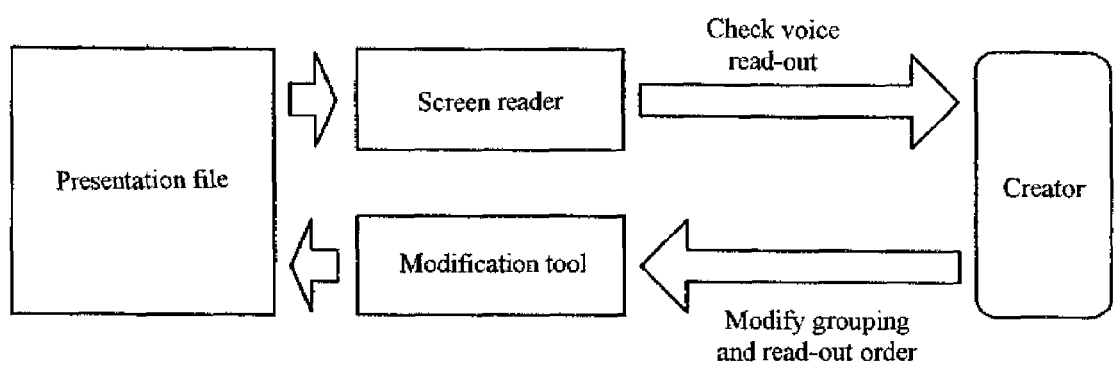

[Figure 18]
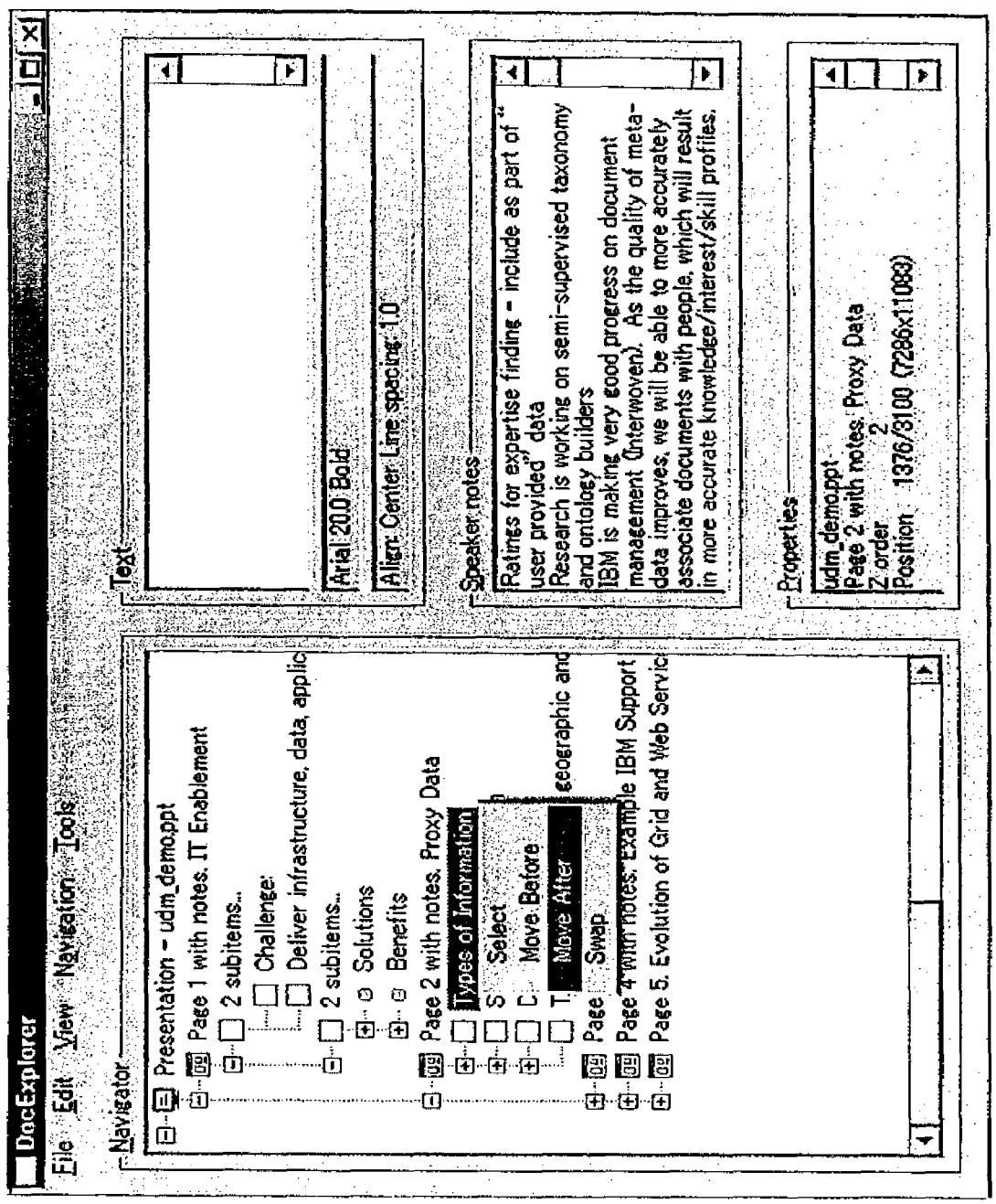

[Figure 19]
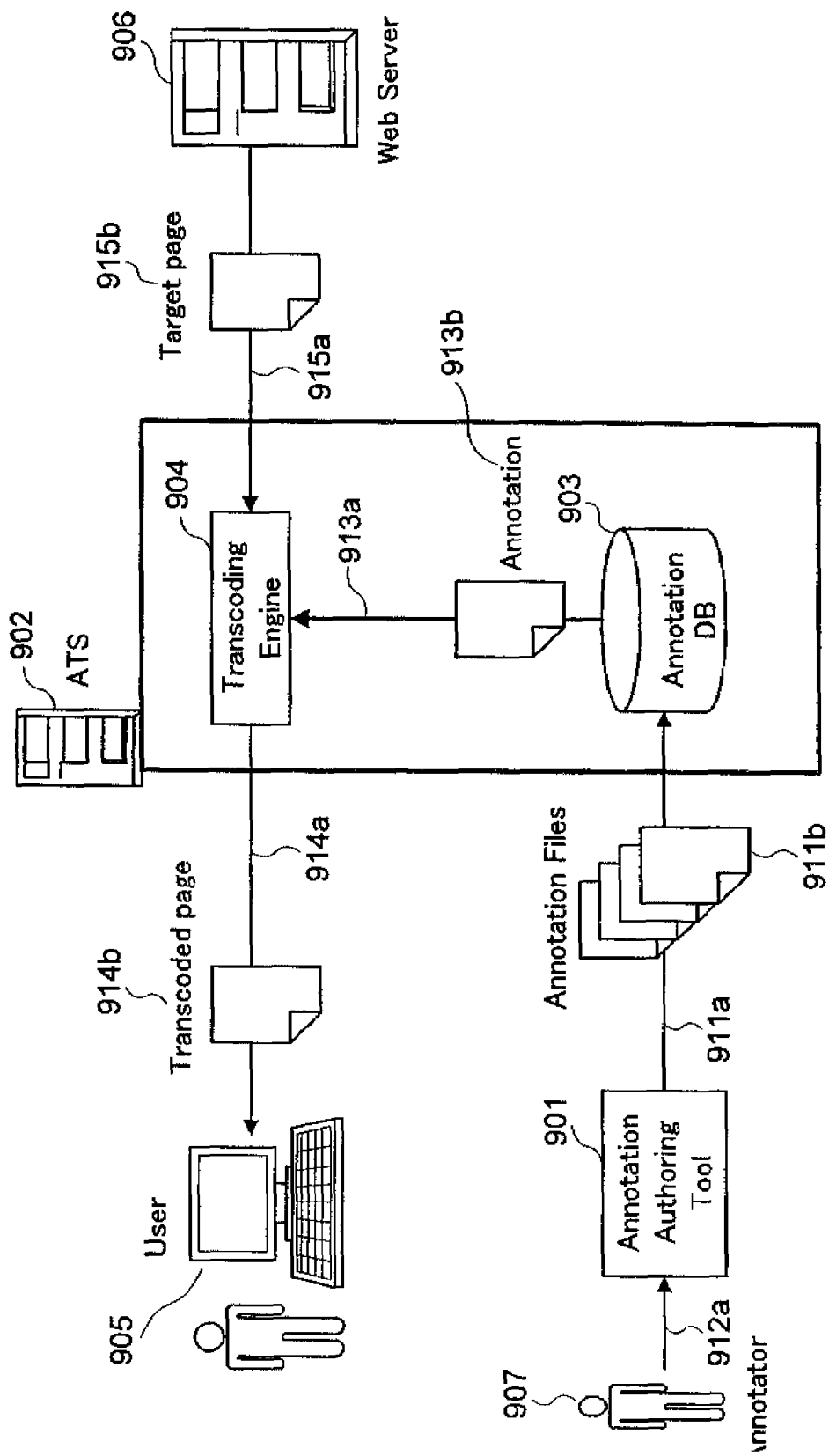

[Figure 20]
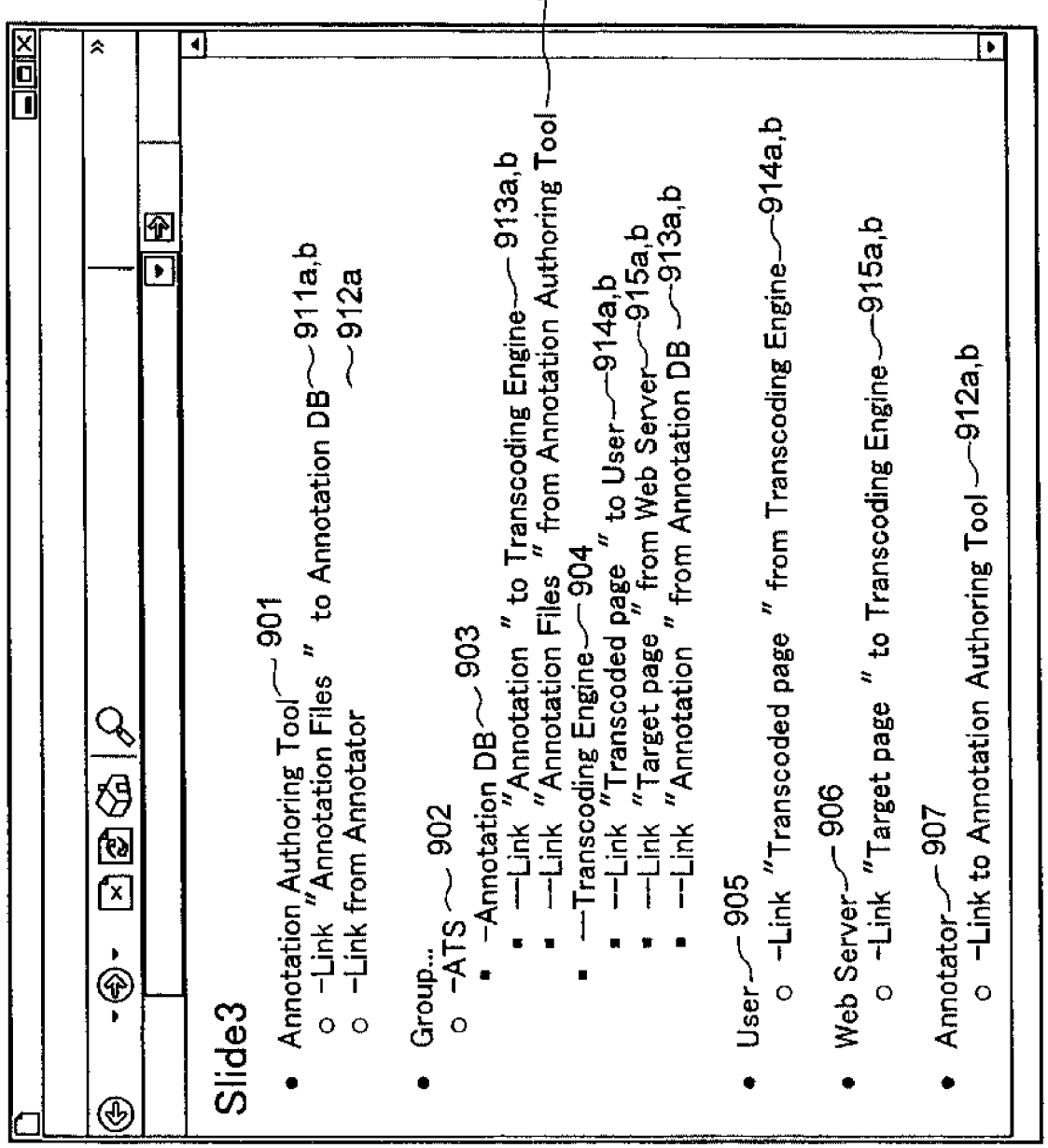

[Figure 21]
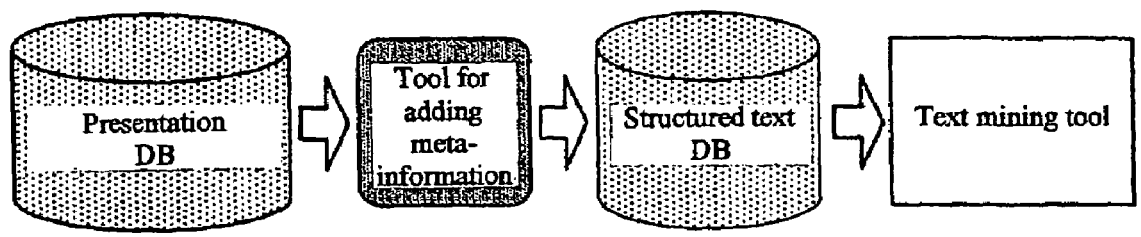
[Figure 22]
Mr. Suzuki ——————Annual income——————▶ 100,000,000 yen
Ms. Yamada ——————Annual income——————▶ 200,000,000 yen

METHOD, PROGRAM, AND DEVICE FOR ANALYZING DOCUMENT STRUCTURE

FOREIGN PRIORITY

This application claims priority to Japanese application Serial No. 2005-255548, filed Feb. 9, 2005. The requirements set forth under 35 U.S.C. 371(c) were fulfilled on Aug. 7, 2006.

BACKGROUND

1. Field of the invention

The present invention relates to a method, program, and device for analyzing a document structure, and more specifically to a method, a program, and a device for analyzing a structure of a presentation document.

2. History of Related Art

In recent years, it has been common to use a presentation tool in a personal computer (PC) environment to create documents for use in making a presentation (presentation files).

A presentation file typically includes information such as text, graphics, images, and sounds, and it is created and stored by a presentation tool in various file formats. To expand the range of utilization of many presentation files created in this manner, methods are emerging that convert a presentation file into a form convenient for voice access (read-out) or for searching a file database.

For example, a tool for converting a file of Microsoft PowerPoint (®) (simply referred to as PowerPoint hereafter) into an HTML and a tool for extracting text (e.g., http://www.rdpslides.com/pptools/ppt2html/index.html and http://cita.disability.uiuc.edu/software/office/), and a technique for efficiently searching for presentation files (e.g., Published Unexamined Patent Application No. 2004-265097) are known.

Adding meta-information to document information allows an improved accuracy of document searches and of text mining techniques, which leads to efficient management of a large amount of information. For a text file, meta-information can be simply added to the file such as by extracting keywords. However, for a file like a presentation file in which a user may arbitrarily place objects such as text, graphics, and images, the document information as well as the position of the objects on a page has important meanings. Therefore, extracting the position information is essential.

Consider the slide shown in FIG. 1 as an example. If a structured text output such as one indicated below is obtained based on the position of the objects, dependency relationships among the texts can be understood. A "dependency relationship" as used herein refers to: a parent-child relationship (inclusion relationship) detected based on an overlap between objects; a sibling relationship (also referred to as a parallel relationship or sibling) detected based on the position of objects relative to each other; or a link origin and link target relationship between objects represented by graphics such as an arrow.

Exemplary Structured Text Output
Main image: Car
  ○ FIG. 1
    ☐ Space Shuttle
  ○ FIG. 2
    ☐ Airplane
  ○ FIG. 3
    Motorcycle However, no techniques are known that extract such positional information and generate structured data that is readily applicable to voice access or text mining. Text mining as used herein refers to a technique of analyzing and mining a large amount of data to derive useful information. In view of the above issues, the present invention aims to solve the following problems (1) to (4) in conventional art.

(1) Problem with the Read-out Order

Since presentation files are created by different users in different formats, it is difficult to understand the content of the files with voice access (automatic read-out). For example, screen readers (software for providing voice output of GUI screens) can only read out objects on a slide one-dimensionally in order of depth of the objects (this direction is referred to as the Z coordinate herein, which is a third coordinate relative to the X and Y coordinates). The slide of FIG. 1 will then be read out in the order in which the objects were generated, as in the following example.

Airplane
Space Shuttle
Motorcycle
Main image: Car
FIG. 1
FIG. 2
FIG. 3

This voice output alone cannot provide positional information about the visual document structure, so that it is difficult to understand the content of the document. For a presentation file created without much thought, the screen reader will read out the objects in the order in which they were generated. Typically, a user does not necessarily create a presentation file in conceptual order. Therefore, it is difficult to understand the content of the presentation file by causing the screen reader to read out the file.

To solve this, the first of the above-mentioned tools (PPT2HTML) has a function to sort along the Z coordinate as shown in the left part of FIG. 2. This tool allows changing the read-out order by selecting an object in a select box for which changing the read-out order is desired, and by moving the object in the select box using up and down buttons. However, this tool still requires changing the order for each object, which is a cumbersome task. Therefore, the ability of sorting a plurality of objects as a conceptual unit would reduce burdens on the user.

(2) Problem with Reading out Diagrams

In order for a diagram contained in a presentation file to be read out, a technique is typically used that replaces the diagram with text briefly describing the diagram, i.e., what is called alternative text (Alt text). However, inserting the Alt text into all objects in a presentation file is a laborious task.

For example, in the second of the above-mentioned tools (cita.disability.uiuc.edu/software/office/—Illinois Web Publishing Wizard), data must be entered to a wizard (a mechanism that facilitates operation on sophisticated application software by presenting questions to be interactively answered) on a screen as shown in FIG. 3 in order to insert the Alt text into all objects. This is a time-consuming task for a slide on which many complicated diagrams appear. Therefore, the ability of dealing with a diagram made up of a plurality of objects as a group would also reduce burdens on the user in inserting the Alt text.

(3) Problem with Acquiring Information about Positional Relationships between Objects Conventional art does not allow effective use of graphics helpful for understanding the relationships between objects, such as "arrows," unless the Alt text is inserted into the graphics.

(4) Applications of Presentation Files to the Field of Natural Language Processing In analyzing a presentation file using a technique such as text mining, there has been no way other than to separately analyze text obtained for each object on a slide. If the above-mentioned dependency relationships among objects on the slide were found, text obtained from objects related to each other would be able to be collectively analyzed. Therefore, an improvement of accuracy of techniques such as text mining could be expected.

SUMMARY OF THE INVENTION

The present invention proposes a technique for structuring a presentation file based on visual information. Specifically, the following approach is used.

A method for analyzing a document structure in a presentation file containing objects, as well as a computer program and device for implementing the method are provided. The method comprises the steps of: receiving the presentation file; extracting overlap information between the objects on a slide that constitutes a page of the presentation file and grouping the objects as a parent-child relationship to obtain structured data reflecting the parent-child relationship; grouping the objects as a sibling relationship by using distance information between the objects to obtain structured data reflecting the sibling relationship; and outputting the structured data obtained in the grouping steps as meta-information.

The method, as well as the computer program and device for implementing the method may also comprise adding, as link information, a link relationship and a link label to the meta-information in response to detection or designation of existence of the link relationship between the objects on the slide.

The present invention automatically structures a presentation file. This facilitates reading-out of the presentation file by voice access and allows an improvement of the accuracy of natural language processing techniques such as text mining. In addition, an automatically detected result of data structuring may be effectively used to modify the read-out order in a simple manner.

BRIEF DESCRIPTION OF THE DRAWINGS AND SYMBOLS

FIG. 1 shows an exemplary presentation slide to be structured;

FIG. 2 shows an operation screen of a PPT2HTML tool;

FIG. 3 shows an Alt text input screen in Illinois Web Publishing Wizard;

FIG. 4 shows a schematic configuration of a document structure analysis device in an embodiment according to the present invention;

FIG. 5 shows a flowchart of adding meta-information in an embodiment according to the present invention;

FIG. 6 shows an example of an overlap between objects;

FIG. 7 shows a definition of the distance between objects;

FIG. 8 shows a conceptual view of dividing a graph;

FIG. 9 shows a flowchart of distance-based grouping;

FIG. 10 shows an exemplary structuring of the slide of FIG. 1;

FIG. 11 shows a flowchart (1) of grouping based on alignment in the direction of the X or Y axis;

FIG. 12 shows a flowchart (2) of grouping based on alignment in the direction of the X or Y axis;

FIG. 13 shows an exemplary slide having many aligned objects;

FIG. 14 shows an exemplary conversion of the slide of FIG. 13 into table structures;

FIG. 15 shows an exemplary slide with an arrow;

FIG. 16 shows structured data for the slide of FIG. 1 with link information added thereto;

FIG. 17 shows an example of modifying voice read-out using a modification tool;

FIG. 18 shows a screen for modifying a read-out order and a grouping result;

FIG. 19 shows an exemplary slide with arrows;

FIG. 20 shows an exemplary output for the slide of FIG. 19 onto an HTML screen;

FIG. 21 shows an application to text mining; and

FIG. 22 shows exemplary privacy information obtained from dependency relationships between objects.

| | |
|---|---|
| 400 | document structure analysis device |
| 401 | input part |
| 402 | presentation file storage unit |
| 403 | overlap grouping part |
| 404 | graph dividing grouping part |
| 405 | distance information grouping part |
| 406 | threshold computation part |
| 407 | distance-based grouping part |
| 408 | alignment-based grouping part |
| 409 | link information extraction part |
| 410 | link extraction part |
| 411 | link label extraction part |
| 412 | output part |
| 413 | meta-information storage unit |
| 901 | object 1 |
| 902 | object 2 |
| 903 | object 3 |
| 904 | object 4 |
| 905 | object 5 |
| 906 | object 6 |
| 907 | object 7 |
| 911a | arrow 1 |
| 911b | link label 1 |
| 912a | arrow 2 |
| 913a | arrow 3 |
| 913b | link label 3 |
| 914a | arrow 4 |
| 914b | link label 4 |
| 915a | arrow 5 |
| 915b | link label 5 |

DETAILED DESCRIPTION OF THE INVENTION

As an exemplary embodiment of the present invention, FIG. 4 shows a schematic configuration of a document structure analysis device for structuring a presentation file. The document structure analysis device 400 includes: an input part 401 that has means of inputting a presentation file from a presentation file storage unit 402; an overlap grouping part 403 that detects overlaps between objects and groups the objects; a graph dividing grouping part 404 that further groups the objects by using a graph dividing technique; a distance information grouping part 405 that groups the objects based on their distance information and according to a threshold obtained by predefined computations; a link information extraction part 409 that extracts arrow graphics between the objects as link information; and an output part 412 that outputs structured data resulting from the groupings and from the link information to a meta-information storage unit 413. The graph dividing grouping part 404 and the distance information grouping part 405 are collectively referred to as a sibling relationship grouping part.

The grouping part 405 according to a threshold includes a threshold computation part 406, a distance-based grouping part 407, and an alignment-based grouping part 408. As will be described below, from a distribution histogram of the distance between the objects, the threshold computation part 406 computes a threshold that will be a value for determining whether or not to perform the grouping. The resulting threshold is used by the distance-based grouping part 407 or the alignment-based grouping part 408, which will actually perform the grouping, as a value for determining whether or not to perform the grouping.

The distance-based grouping part 407 performs the grouping if the distance between the objects is shorter the threshold. The alignment-based grouping part 408 performs the grouping by generating structured data as a table structure: the table structure is generated if the distance between the objects does not have a misalignment in the X or Y direction, i.e., if the objects are vertically or horizontally aligned. Whether the grouping is performed by the distance-based grouping part 407 or by the alignment-based grouping part 408 may be user-selected or automatically selected.

The link information extraction part 409 includes a link extraction part 410 and a link label extraction part 411. A link (arrow) between the objects and a link label (label for the arrow) may be extracted as link information and added to the structured data.

The above-described device automatically generates meta-information for structuring a presentation file. The meta-information may be generated in a proprietary format, but if a meta-file is defined for a presentation tool, the meta-information obtained as above may be added to the meta-file. This, in addition to allowing the voice access, allows the use of the presentation file data in such fields as text mining and document search, thereby contributing to the improvement of the accuracy of these techniques. Furthermore, as described above, the grouping result may be selectively converted into and output as the table structure, and the link information between the objects may be output by analyzing the arrows.

The meta-information for structuring a presentation file according to the technique of the present invention represents parent-child relationships or sibling relationships between the objects derived from positional relationships between the objects. A parent-child relationship between the objects is derived from information about an overlap between the objects. A sibling relationship is derived from information based on the distance between the objects.

As an example, see Example 1 below that describes the meta-information added to the slide of FIG. 1 by the structuring.

FIG. 5 is a flowchart of a method which is an embodiment according to the present invention is illustrated. As shown in FIG. 5, a presentation slide (meaning a page in a presentation file) is structured according to steps S01 to S10 described below.

The steps S02 to S09 in FIG. 5 are not intended to be necessarily performed in the described order. Rather, the order in which the steps are performed may be changed as specified by the user. For example, some presentation files may advantageously obtain the result in a shorter time by exchanging the order of step S03 and steps S04 to S07. Also, exchanging the order may sometimes provide a better grouping result. However, steps between S04 and S07 are a block of sequential steps, in which steps S06 and S07 are selectively performed according to the determination at step S05.

First, at step S02, overlaps between the objects are extracted, and the grouping is performed based on the parent-child relationships between the objects. Then, at step S03 and steps S04 to S07, the distance information between the objects are used to perform the grouping based on the sibling relationships (parallel relationships) At step S03, the objects are represented as nodes of a graph, and the grouping between the objects is treated as a graph problem that involves recursively dividing the graph. That is, the process of dividing the objects into two groups is repeated. Further, a threshold is computed at step S04, and the objects closer to each other than the threshold are grouped together at step S06 or S07. While step S03 and steps S04 to S07 are similar in that the distance information between the objects is used for the structuring, they have respective characteristics as shown in the Table 1 below.

TABLE 1

| | Optimal grouping is performed in view of the relationships of all objects. | Good result is obtained without enough amount of objects. | Computational complexity |
|---|---|---|---|
| Structuring based on dividing a graph (top-down: larger units are divided into smaller units) | o | x | x |
| Structuring based on threshold (bottom-up: smaller units are combined into larger units) | x (Determinations are based only on the distance relationships between neighboring objects.) | o | o |

Thus, the structuring by dividing the graph at step S03 is performed in view of the relationships of all objects, therefore generally involves high computational complexity. Also, without enough amount of objects, a good result may not be obtained. In contrast, the structuring according to the threshold at steps S04 to S07 is determined based only on the distance relationships between neighboring objects. Therefore, computational complexity is generally low, and an insufficient number of objects cause no problems. For this reason, the objects are roughly grouped at step S03 and then finely grouped at steps S04 to S07. Alternatively, the objects may be first grouped at steps S04 to S07 with less computational complexity and further grouped at S03.

Optionally, the link information about graphics such as arrows between the objects on the presentation slide may be added to the meta-information (step S09). Whether or not to add the link information is determined at step S08. This determination may be made with a menu by which the user can make a selection, or may be automatically made by detecting the presence of arrows, as will be described below.

Now, each of the steps in FIG. 5 will be described in detail.

[Grouping Based on Overlaps (Step S02)]

First, the step of grouping the objects as the parent-child relationships based on overlaps between the objects will be described.

Objects overlapping each other are considered as having a parent-child relationship. When an object has another object overlapping it, whether or not to group these objects together is determined in the following manner (see FIG. 6).

(1) All objects on a page are sorted in order of increasing area. Then, (2) to (4) are performed for each object.

(2) An object A having the smallest area among the ungrouped objects is selected.

(3) An object which has a portion overlapping the object A and whose value determined by dividing the overlapping area by the area of the object A is larger than a certain value is found. This object is grouped with the object A.

(4) If more than one objects are found at (3) above (objects B and C in FIG. 6), the overlapping area of each object potentially grouped with the object A is divided by the area of that object. An object having the largest value is grouped with the object A.

In FIG. 6, the overlap between the objects A and B is larger than that between the objects A and C. Therefore, the object B is selected as the parent of the object A.

Next, the grouping by dividing the graph and the grouping based on the threshold will be described. These groupings are similar in that the objects are grouped as the sibling relationships (parallel relationships) and that the distance between the objects described below is used.

<Definition of the Distance>

The distance used at step S03 and steps S04 to S07 is defined as follows. In grouping the objects, those placed close to each other as well as aligned with each other are often conceptually associated with each other. To meet this, the Manhattan distance along the X and Y axes is used as shown in FIG. 7(a), rather than the direct distance.

The Manhattan distance is defined as $|X_1-X_2|+|Y_1-Y_2|$, wherein the coordinates of the midpoint or endpoint of a side of two objects are $(X_1, Y_1)$ and $(X_2, Y_2)$ respectively.

With this definition, the computation of the distance can be done simply by addition and subtraction and is therefore faster than in the case of the direct distance. In addition, the "distance due to misalignment" shown in FIG. 7(b) can be simultaneously obtained.

[Grouping Based on Dividing a Graph (Step S03)]

Consider a graph G (V, E) whose nodes are the objects on a presentation slide. FIG. 8 is a conceptual view of a "graph," in which a symbol ○ represents a node (vertex) and a solid line or dotted line represents an edge (Edge) between the nodes. With this model, the grouping is to remove the edges from the graph so that two groups are formed (remove the dotted lines in FIG. 8). The "cost" of removing an edge may be defined in terms of the similarity between the nodes. Then, the optimal grouping is dividing such that the total cost of removing the edges is minimized. The cost $W_{ij}$ between an i-th node and a j-th node is defined as:

$$w_{ij} = e^{\frac{-\|d_{ij}\|}{\sigma_D}}$$ [Formula 1]

wherein $d_{ij}$ is the distance between the i-th object and the j-th object computed as described above, and $\sigma_D$ is a parameter. If attributes of the objects (e.g., the color of the objects or whether the objects include text) are considered in grouping, the similarity may be defined as:

$$w_{ij} = e^{\frac{-\|F_i-F_j\|}{\sigma_I}} * e^{\frac{-\|d_{ij}\|}{\sigma_D}}$$ [Formula 2]

wherein $F_i$ is a vector defined by an attribute of the i-th object, and $\sigma_I$ is a parameter. Using the costs between the nodes in the graph defined as above, the graph may be divided into two groups. This dividing algorithm is disclosed in "Jianbo Shi and Jitendra Malik: Normalized Cuts and Image Segmentation, IEEE Transactions on Pattern Analysis and machine Intelligence, vol 22, num 8, pp. 888-905, (2000)", the subject matter of which is incorporated herein by reference. Recursively repeating this operation may result in the grouping that reflects the relationships of all objects on the slide.

[Grouping Based on a Threshold (Steps S04 to S07)]

Now, the method of grouping based on the threshold will be described. This method involves the following three operations.

(1) Group the objects such that the distance between their closest vertical sides is shorter than the threshold (i.e., group the objects close to each other and aligned in the X direction).

(2) Group the objects such that the distance between their closest horizontal sides is shorter than the threshold (i.e., group the objects close to each other and aligned in the Y direction).

(3) Group the objects such that the distance between their closest sides is shorter than the threshold (i.e., group the objects close to each other but not aligned in the X or Y direction).

The threshold for determining whether or not to perform the grouping is determined as follows. First, for each object, the distances of (1) to (3) to other objects are determined. Then, based on the distribution of these distances, the optimal distance is selected as the threshold so that the variance between two groups (grouped distances and ungrouped distances) is maximized (N. Otsu: A threshold selection method from gray-level histograms, IEEE Trans. On Sys., Man, and Cybernetics, SMC-9, 1, pp. 62-66 (1979)).

In determining the distribution of the distances, the shortest three distances from each object to other objects are taken for (1) and (2), and the shortest five distances are taken for (3). The number of three or five has been determined empirically, but other numbers may be selected. By performing this for all objects, the distances from each object to other grouped objects and ungrouped objects are included in the distribution, even if the objects are closely aligned as in the case of a table structure.

[Distance-Based Grouping (Step S06)]

FIG. 9 shows a procedure of the distance-based grouping (step S06) in detail. At step S22, an array A ($O_1$, $O_2$, $O_3$, . . . , $O_N$) containing N objects is taken, and a counter n is initialized to one.

Step S23 indicates that the following steps are repeated until n exceeds N. Then, at step S24, the distances from an n-th object to other N-1 objects in the X and Y directions, i.e., ($X_1$, $Y_1$), ($X_2$, $Y_2$) . . . ($X_{N-1}$, $Y_{N-1}$) are computed.

The minimum value $X_{min}$ for the X direction and the minimum value $Y_{min}$ for the Y direction are compared to determine the smaller one $D_{min}$ (step S25). If the obtained $D_{min}$ is smaller than the threshold (Th) automatically determined at step S04, the object from which the $D_{min}$ was obtained and the n-th object are grouped together. These two objects are deleted from the array A, and a new object resulting from this grouping is added to the end of the array A (step S27).

For example, when objects $O_2$ and $O_3$ are grouped together to produce a new object $O_{23}$, the array A after the processing at step S27 will be A ($O_1$, $O_4$, . . . , $O_{N-1}$, $O_{23}$) containing N-1 objects. The objects in the array are renumbered to form a new array A ($O_1$, $O_2$, . . . , $O_{N-1}$).

This operation is repeated until n exceeds N, i.e., until no more changes occur for all objects (steps S28 and S23). FIG. 10 shows the slide shown in FIG. 1 that has been subjected to the above steps and has been output as an HTML.

[Conversion into a Table Structure using Grouping Information (Step S07)]

The grouping based on the distance may be performed as described above, but in the case where many objects are aligned vertically or horizontally, conversion into a table structure may facilitate understanding of the positional relationships and navigating. The present technique may convert the grouping result into a table structure. The determination of whether or not to perform conversion into a table structure (step S05) may be made by user selection. Alternatively, the number of objects aligned vertically or horizontally may be extracted, and if such objects constitute more than a certain percentage, conversion into a table structure may be performed.

In the grouping at step S06 described in the previous part, the process of grouping the closest objects is repeated if more than one objects are closer to each other than the threshold. Conversion into a table structure can be performed by grouping all objects closer than the threshold at the above step S06 first in the direction of the X axis and then in the direction of the Y axis. This procedure will be shown in a flowchart of FIGS. 11 and 12.

At step S42 in FIG. 11, an array A ($O_1, O_2, O_3, \ldots, O_N$) containing N objects is taken, and a counter n is initialized to one. Step S43 indicates that the following steps are repeated until n exceeds N. At the next step S44, the distances from an n-th object to other N-1 objects in the X and Y directions, i.e., ($X_1, Y_1$), ($X_2, Y_2$) ... ($X_{N-1}, Y_{N-1}$) are computed.

An evaluation value D at step S45 in FIG. 11 (also at step S52 in FIG. 12) is defined as follows.

(Formula 1)

D=2: when the distance between the midpoints on respective sides is shorter than the threshold.

D=1: when the distance between points other than the midpoints on respective sides (the upper or lower endpoints for the vertical sides, or the left or right endpoints for the horizontal sides) is shorter than the threshold.

D=0: when the distance between points other than the points defined for the cases of D=2 or D=1 is shorter than the threshold.

At step S45, for objects that can be grouped in the X or Y directions, the maximum value $D_x$ for the X direction and the maximum value $D_y$ for the Y direction are determined out of the evaluation values D defined by the formula (1).

Then, at step S46, $D_x$ and $D_y$ are compared. If $D_x >= D_y$, then the flow proceeds to the next step S47. If $D_x < D_y$, then n is incremented by one and the flow returns to step S43.

At step S47, the object from which $D_x$ was obtained and the n-th object is grouped together. These two objects are deleted from the array A, and a new object resulting from this grouping is added to the end of the array A. For example, when objects $O_2$ and $O_3$ are grouped together to produce a new object $O_{23}$, the array A after the processing at step S47 will be A ($O_1, O_4, \ldots, O_{N-1}, O_{23}$) containing N-1 objects. The objects in the array are renumbered to form a new array A ($O_1, O_2, \ldots, O_{N-1}$).

This operation is repeated until n exceeds N (steps S48 and S43) When the processing in the X direction is completed, the processing in the Y direction is performed in the same manner as shown in FIG. 12. The steps S49 to S56 in FIG. 12 are just the same as FIG. 11 except that X is replaced with Y and therefore are not be described.

Finally, at step S56 in FIG. 12, the steps starting from S42 are repeated until no more changes occur for all objects, at which point the processing terminates (step S57).

As an example, a slide of FIG. 13 may be converted into table structures according to the above-described algorithm and displaying as a tree view as in FIG. 14.

[Analysis of Link Information (Step S09)]
Link Expression of Arrow Information

In this step, in order to facilitate understanding of the positional relationships between the objects, arrows that play important roles in making a presentation are represented as links. A link relationship between an object "PC" and an object "Server" in FIG. 15 may be represented by text as follows.

<PC> Link to Server
<Server> Link from PC

When a presentation slide is created, text (a link label) is often placed near an arrow for explicitly attaching a meaning to the arrow. This text may be detected as a link label by applying the above-described grouping technique. If an arrow has a label "HTTP" as shown in FIG. 15, it may be represented as follows.

<PC> Link "HTTP" to Server
<Server> Link "HTTP" from PC

An example is shown in FIG. 16, in which the slide of FIG. 1 has been structured and then displayed with links.

However, arrows are sometimes used otherwise, for example, as coordinate axes (such as the X, Y, and Z axes) in a diagram. In such a case, displaying the arrows as links is not appropriate. This can be addressed by the above-described technique of determining the grouping threshold, so that an arrow is prevented from being displayed as a link if the distance from the arrow to the link target is longer than the threshold.

EXAMPLES

Now, examples of the present invention will be described.

Example 1

Example of Adding Meta-Information

The meta-information added to the slide of FIG. 1 by the technique of the present invention is indicated as the underlined parts below.

```
<group id="1">
    <object type="text">Main image : Car</object>
    <object type="picture"></object>
    <link to="2"></object>
    <link to="3"></object>
    <link to="4"></object>
</group>
<group>
    <group id="2">
        <object type="text">FIG.1</object>
        <object type="picture"></object>
        <object type="text">Space Shuttle</object>
        <link from="1"></object>
    </group>
    <group id="3">
        <object type="text">FIG.2</object>
        <object type="picture"></object>
        <object type="text">Airplane</object>
        <link from="1"></object>
    </group>
    <group id="4">
        <object type="text">FIG.3</object>
        <object type="picture"></object>
        <object type="text">Motorcycle</object>
        <link from="1"></object>
    </group>
</group>
```

Example 2

Use of a Modification Tool to Create a Presentation File for Easy Voice Access

FIG. 17 shows a flow of using the technique according to embodiments of the present invention to create a presentation file that is easily accessed by a screen reader. A creator of the presentation can use the screen reader to check how the file is actually read out. While doing so, the creator can use a modification tool as shown in FIG. 18 to modify the read-out order and the grouping.

Here, the result of automatic structuring may be used to facilitate modification of the read-out order. The structured data is displayed in a tree view. When it is desired to modify the position of an object, the object maybe selected and then "Select" in a right-click menu may be chosen. Then, the object may be moved to a position before or after another object by causing a right-click menu to be displayed on the other object and choosing either "Move Before" or "Move After." Two objects may be exchanged by selecting the two objects, causing a right click menu to be displayed, and choosing "Swap." Thus, since the objects can be reordered as automatically structured groups, the read-out order can be efficiently determined.

Example 3

Conversion of a PowerPoint File into HTML

According to the technique of embodiments of the present invention, a slide of FIG. 19 may have the meta-information added thereto and may be converted into an HTML as in FIG. 20. The slide of FIG. 19 has seven objects 901 to 907 and five arrows 911a, 912a, 913a, 914a, and 915a. The object 902 forms a group including the objects 904 and 903. The arrows have their respective attached link labels 911b, 913b, 914b, and 915b. There is no link label 912b because the arrow 912a does not have an attached link label.

The objects, arrows, and labels shown in FIG. 19 are indicated by corresponding symbols in FIG. 20. It should be noted that an arrow with a link label C from an object A to another object B appears twice as a pair of link information items as below.
 <A> Link "C" to B
 <B> Link "C" from A Example 4

Application to Text Mining

The data structured by the technique according to embodiments of the present invention may be converted into a natural language expression, which may be output in a text form to improve the accuracy of techniques such as text mining.

FIG. 21 shows an example in which a presentation file structured by the present technique and having the meta-information added thereto is applied to text mining. In the approach shown, the method, program, and device according to the present invention is used as a tool for adding the meta-information, and a presentation file from a presentation file database is output to a structured text database. Conventionally, text obtained from each object has been individually analyzed. Structuring the objects allows utilizing the dependency relationships between the objects, thereby improving the accuracy of text mining.

For example, as shown in FIG. 22, text obtained individually from each object alone does not provide privacy information. However, incorporating the dependency relationships between the objects allows providing information on the annual income of each person, therefore providing privacy information.

While the present invention has been described using embodiments and examples, the technical scope of the present invention is not limited to the scope described in the above embodiments. Rather, various modifications and improvements may be made to the above embodiments. It is apparent from the description in the claims that embodiments with such modifications or improvements may also be included in the technical scope of the present invention.

In one embodiment of the present invention, the document structure analysis device 400 (FIG. 4) and the method including the steps described in FIGS. 7, 9, and 11 may be implemented as a program on a computer. A storage medium for storing the program may be an electronic, magnetic, optical, magneto-optical, infrared, or semiconductor system (or device or equipment) or propagation medium. Examples of a computer-readable medium include a semiconductor or solid-state storage device and a magnetic tape. Examples of a computer-readable removable medium include a semiconductor or solid-state storage device, a magnetic tape, a removable computer diskette, random access memory (RAM), read only memory (ROM), a rigid magnetic disk, and an optical disk. Examples of a current optical disk include a compact disk-read only memory (CD-ROM), a compact disk-read/write (CD-R/W), and a DVD.

The invention claimed is:

1. A method for analyzing a document structure in a presentation file containing objects, the method comprising the steps of:
 receiving the presentation file;
 extracting overlap information between the objects in the presentation file and grouping the objects as a parent-child relationship to obtain a first structured data reflecting the parent-child relationship;
 grouping the objects as a sibling relationship by using a distance information between the objects to obtain a second structured data reflecting the sibling relationship;
 generating, in response to detection or designation of existence of arrow graphics representing a link relationship between the objects in the presentation file, link information including the link relationship between the objects and a link label for the arrow graphics;
 generating meta-information for the presentation file from the generated link information and at least one of the first structured data or the second structured data; and
 modifying a grouping and a voice read-out order by using the generated meta-information.

2. The method according to claim 1, wherein grouping the objects as a sibling relationship comprises grouping the objects by representing the objects as nodes for a graph problem and by recursively dividing a graph so that a predefined cost determined using the distance information between the objects is minimized.

3. The method according to claim 1, wherein grouping the objects as a sibling relationship comprises grouping the objects based on a threshold determined by a predefined computation from a distribution histogram of the distance information.

4. The method according to claim 1 further comprising, in response to detection or designation of existence of arrow graphics representing a link relationship between the objects in the presentation file, adding the link relationship and a link label for the arrow graphics to the meta-information as link information between the objects.

5. The method according to claim 1, wherein the distance information is a Manhattan distance between the objects.

6. The method according to claim 1, wherein the distance information is used to group the objects as a table structure based on alignment information, the alignment information being one of a first distance between vertical sides of the objects in the direction of the X axis or a second distance between horizontal sides of the objects in the direction of the Y axis.

7. The method according to claim 5, wherein the Manhattan distance is a distance between closest sides of the objects.

8. The method according to claim 1, wherein one of the first structured data or the second structured data resulting from at least one of the grouping the objects as a parent-child relationship or the grouping the objects as a sibling relationship is used as an input for text mining.

9. A device for analyzing a document structure in a presentation file containing objects, the device comprising:
  an input part for receiving the presentation file;
  an overlap grouping part for extracting overlap information between the objects in the presentation file and grouping the objects as a parent-child relationship to obtain a first structured data reflecting the parent-child relationship;
  a sibling relationship grouping part for grouping the objects as a sibling relationship by using a distance information between the objects to obtain a second structured data reflecting the sibling relationship;
  a link information extraction part for, in response to detection or designation of existence of arrow graphics representing a link relationship between the objects in the presentation file, generating link information between the objects including the link relationship and a link label for the arrow graphics;
  an output part for generating meta-information from the generated link information and at least one of the first structured data or the second structured data and;
  modifying a grouping and a voice read-out order by using the generated meta-information.

10. The document structure analysis device according to claim 9, wherein the sibling relationship grouping part comprises a graph dividing grouping part for representing the objects as nodes for a graph problem and recursively dividing a graph so that a predefined cost determined using the distance information between the nodes is minimized.

11. The document structure analysis device according to claim 9, wherein the sibling relationship grouping part comprises a distance information grouping part for grouping based on a threshold determined by a predefined computation from a distribution histogram of the distance information.

12. The document structure analysis device according to claim 9, wherein the distance information is a Manhattan distance between the objects.

13. The document structure analysis device according to claim 9, wherein the distance information grouping part comprises an alignment information grouping part for grouping the objects as a table structure based on alignment information, the alignment information being one of a first distance between vertical sides of the objects in the direction of the X axis or a second distance between horizontal sides of the objects in the direction of the Y axis.

14. A computer program product stored on a computer-readable medium for making a computer perform the method for analyzing a document structure in a presentation file containing objects, the method comprising the steps of:
  receiving the presentation file;
  extracting overlap information between the objects in the presentation file and grouping the objects as a parent-child relationship to obtain a first structured data reflecting the parent-child relationship;
  grouping the objects as a sibling relationship by using a distance information between the objects to obtain a second structured data reflecting the sibling relationship;
  generating, in response to detection or designation of existence of arrow graphics representing a link relationship between the objects in the presentation file, link information including the link relationship between the objects and a link label for the arrow graphics;
  generating meta-information from the generated link information and at least one of the first structured data or the second structured data; and
  modifying a grouping and a voice read-out order by using the generated meta-information.

15. The computer program product according to claim 14, wherein grouping the objects as a sibling relationship comprises grouping the objects by representing the objects as nodes for a graph problem and by recursively dividing a graph so that a predefined cost determined using the distance information between the nodes is minimized.

16. The computer program product according to claim 14, wherein grouping the objects as a sibling relationship comprises grouping the objects based on a threshold determined by a predefined computation from a distribution histogram of the distance information.

17. The computer program product according to claim 14, wherein the distance information is a Manhattan distance between the objects.

18. The computer program product according to claim 14, wherein the distance information is used to group the objects as a table structure based on alignment information, the alignment information being one of a first distance between vertical sides of the objects in the direction of the X axis or a second distance between horizontal sides of the objects in the direction of the Y axis.

\* \* \* \* \*